United States Patent [19]

Greiner

[11] 4,238,141
[45] Dec. 9, 1980

[54] TIME DELAY SPECTRUM CONDITIONER

[75] Inventor: Norman R. Greiner, Los Alamos, N. Mex.

[73] Assignee: The United States of America as represented by the United States Department of Energy, Washington, D.C.

[21] Appl. No.: 948,454

[22] Filed: Oct. 4, 1978

[51] Int. Cl.³ .................................................. G02B 5/18
[52] U.S. Cl. ............................ 350/162 R; 331/94.5 C
[58] Field of Search .......................... 350/162 R, 168; 331/94.5 C, 94.5 D; 356/310, 326, 328, 331–334

[56] References Cited

U.S. PATENT DOCUMENTS

| | | | |
|---|---|---|---|
| 2,652,742 | 9/1953 | Walsh | 350/168 X |
| 3,443,243 | 5/1969 | Patel | 350/162 R X |
| 3,459,466 | 8/1969 | Giordmaine | 350/162 R UX |
| 3,586,442 | 6/1971 | Tripp | 356/333 X |
| 3,845,294 | 10/1974 | Indig et al. | 350/162 R X |
| 3,907,430 | 9/1975 | Mann | 350/168 X |
| 4,009,391 | 2/1977 | Janes et al. | 250/423 P X |

FOREIGN PATENT DOCUMENTS 830573 10/1975 Belgium .

Primary Examiner—F. L. Evans
Attorney, Agent, or Firm—James E. Denny; Paul D. Gaetjens; William W. Cochran, II

[57] ABSTRACT

A device for delaying specified frequencies of a multiple frequency laser beam. The device separates the multiple frequency beam into a series of spatially separated single frequency beams. The propagation distance of the single frequency beam is subsequently altered to provide the desired delay for each specific frequency. Focusing reflectors can be utilized to provide a simple but nonadjustable system or, flat reflectors with collimating and focusing optics can be utilized to provide an adjustable system.

5 Claims, 5 Drawing Figures

TIME DELAY SPECTRUM CONDITIONER

BACKGROUND OF THE INVENTION

The present invention pertains generally to optics and more specifically to lasers.

The present invention is an improvement of the invention disclosed in application Ser. No. 948,375 entitled "High Efficiency Laser Spectrum Conditioner" filed Oct. 4, 1978 by Norman R. Greiner.

In addition to the spectrum conditioning provided by the above referenced copending application, it is oftentimes desirable to time delay a specified frequency or frequencies of the conditioned laser beam by predetermined amounts. For example, it is desirable in certain instances to compress a pulse mode of a sequence of pulses of different frequencies to provide simultaneous peaking. Time compression of pulses, in this manner, may, for example, improve the process of laser fusion. Additionally, adjustment of a given sequence of frequencies contained in a single beam may provide more advantageous stimulation of an optical amplifier.

SUMMARY OF THE INVENTION

The present invention therefore provides a device for delaying specified frequencies in a multiple frequency laser beam. This is accomplished by altering the propagation distance of one or more spatially separated single frequency beams diffracted from the multiple frequency laser beam. The altered single frequency beams are subsequently recollimated into a collinear parallel output beam.

It is therefore an object of the present invention to provide a device for delaying specified frequencies in a multiple frequency laser beam.

It is also an object of the present invention to provide a device for delaying specified frequencies in a multiple frequency laser beam.

Another object of the present invention is to provide a device for producing a substantially parallel beam of laser radiation at preselected frequencies having specified time delays from a multiple frequency laser beam.

Other objects and further scope of applicability of the present invention will become apparent from the detialed description given herinafter. The detailed description, indicating the preferred embodiments of the invention, is given only by way of illustration since various changes and modifications within the spirit and scope of the invention will become apparent to those skilled in the art from this detailed description.

The foregoing Abstract of the Disclosure is for the purpose of providing a nonlegal brief statement to serve as searching and scanning tool for scientists, engineers and researchers and is not intended to limit the scope of the invention as disclosed herein nor is it intended to be used in interpreting or in any way limiting the scope or fair meaning of the appended claims.

DETAILED DESCRIPTION OF THE PREFERRED EMBODIMENT OF THE INVENTION

Figure 1:
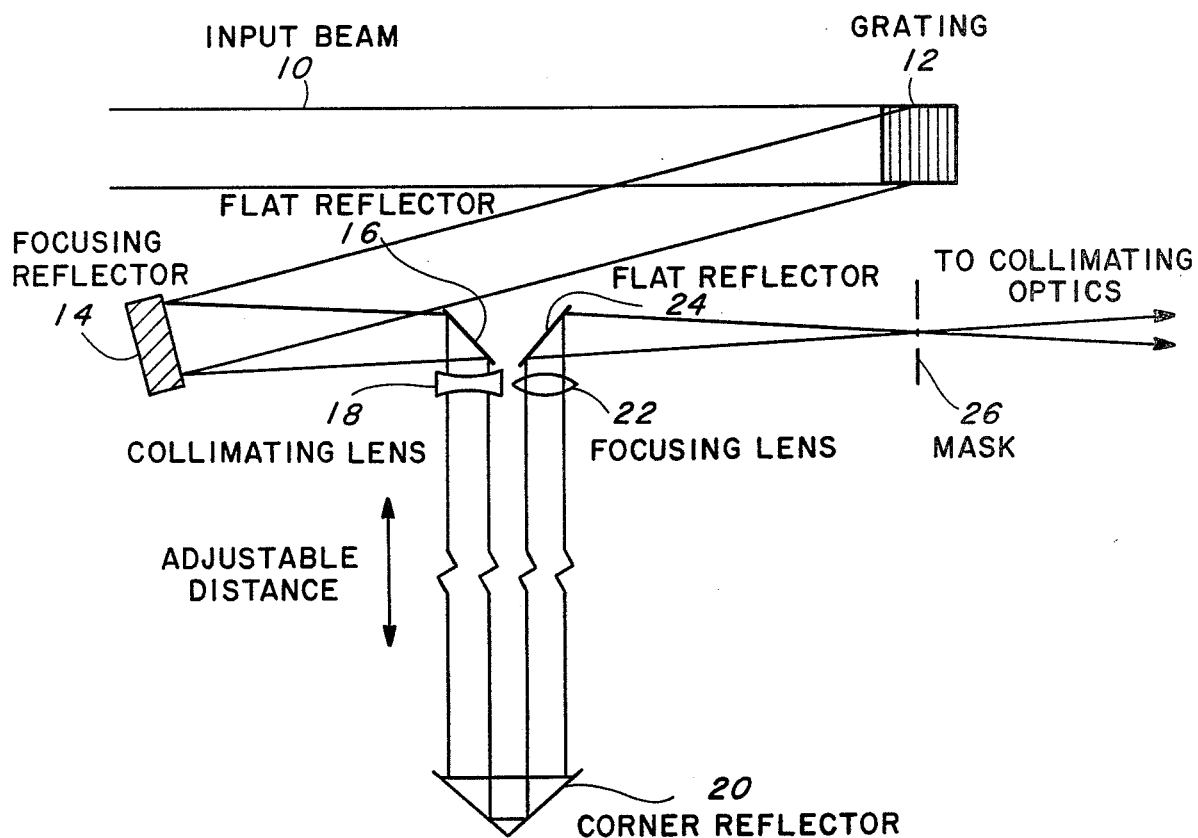
FIG. 1 is a schematic side view of a first embodiment of the present invention.
Figure 3:
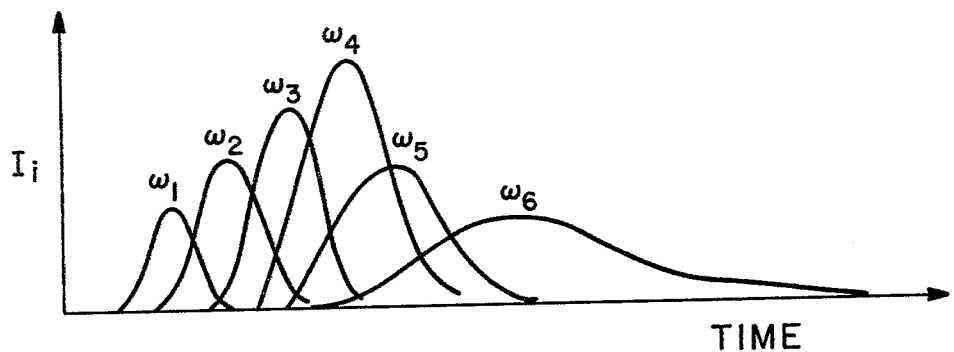
FIG. 3 is a graph of intensity versus time of six frequencies of a typical multifrequency laser beam.
Figure 4:
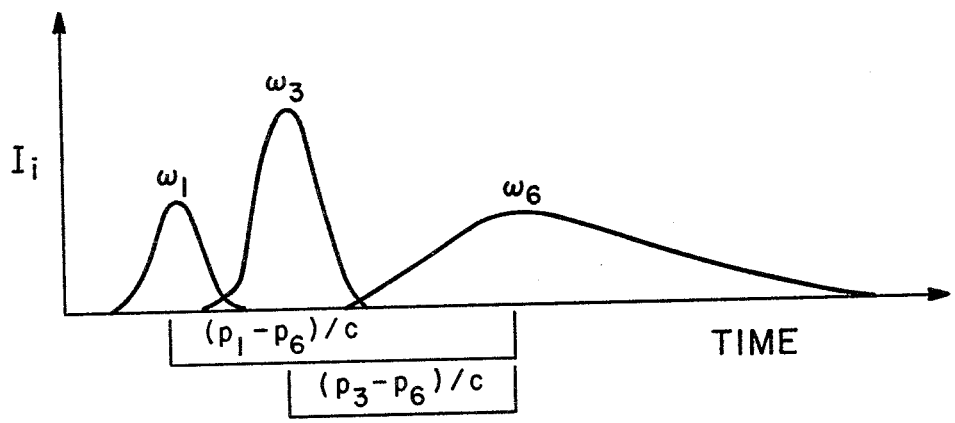
FIG. 4 is a graph of intensity versus time of a spectrum conditioned multifrequency laser beam.

FIG. 1 discloses a side view of a portion of the spectrum conditioner disclosed in the above referenced copending application, together with delay optics comprising the improvement of the first embodiment of the present invention. In the same manner as shown in FIG. 3 of the above referenced copending application, input beam 10 impinges upon grating 12 and is diffracted into a plurality of spatially separated single frequency beams which intersect focusing reflector 14 at a plurality of spatially separated locations. Flat reflector 16 is included within the beam path of a preselected single frequency beam to deflect the single frequency beam through collimating lens 18 which forms a parallel beam. Corner reflector 20 can be adjusted to vary the distance which the preselected beam travels in the deflected beam path. Since light travels in air at approximately 1 foot per nanosecond, the corner reflector 20 can be placed at varying distances to produce desired delays. The reflected beam from corner reflector 20 is focused by focusing lens 22 and reflected by flat reflector 24 to produce a beam which is focused on mask 26 having a convergence angle equal to a beam which would have preceded from focusing reflector 14 to mask 26 without the interjection of the delay optics 16–24. Of course, delay optics such as shown in FIG. 1 can be included within one or more beam paths to provide the desired delay of a particular frequency. Moreover, the delay optics can be included in the input section of the device, as shown in FIG. 1, or in the output section in an adjacent position on the opposite side of mask 26. Collimating optics comprise a corresponding focusing reflector and grating such as disclosed in the above referenced copending application.

Figure 2:
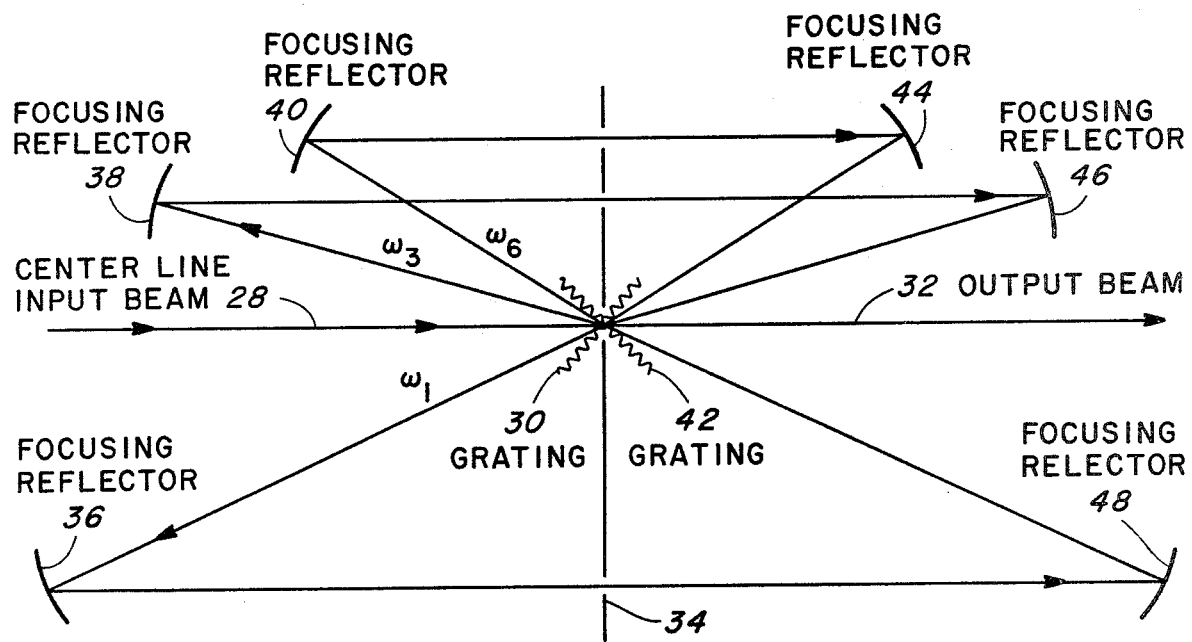
FIG. 2 is a schematic top view of a second embodiment of the present invention.

FIG. 2 schematically illustrates in a top view, an alternative embodiment for producing desired delays of specific frequencies in a multifrequency beam. The center line 28 of the input beam is illustrated in FIG. 2. It intersects grating 30 which diffracts the input beam into a series of single frequency beams $\omega_1$ through $\omega_6$. Since $\omega_2$, $\omega_4$, and $\omega_5$ are not desired in output beam 32, these single frequency beams are not directed toward mask 34 by means of a focusing reflector. The desired single frequency beams, $\omega_1$, $\omega_3$, and $\omega_6$ are focused at apertures in mask 34 by focusing reflectors 36 through 40 respectively. The center lines of the single frequency beams focused by focusing reflectors 36 through 40 are directed in parallel lines at mask 34. In a similar manner, the desired single frequency beams $\omega_1$, $\omega_3$, and $\omega_6$ are directed at grating 42 via focusing reflectors 44 through 48 to generate output beam 32. The desired delay of each frequency for single frequency beams $\omega_1$, $\omega_3$, and $\omega_6$ are provided by the distance of travel of each of these single frequency beams. The embodiment of FIG. 2 provides a rather simple manner of achieving the desired delay of each of the single frequency beams and is capable of generating a good quality output beam 32. However, since reflectors 36–40 and 44–48 must be fabricated for the specific delay desired for their respective frequencies, the device of FIG. 2 does not provide means for readily adjusting the delay for each of these frequencies.

FIG. 3 graphically illustrates a typical input beam wherein the intensity of a series of frequencies $\omega_1$ through $\omega_6$ is plotted in time for a pulse of a typical multifrequency input beam. It should be noted that the peak intensity for each frequency occurs at various times within the pulse. FIG. 2 graphically illustrates the selection of desired frequencies from the input beam shown in FIG. 3 and the required delay to cause each of these selected frequencies to peak simultaneously. For example, $\omega_1$ must be delayed by a period equal to $(p_i - p_6)/c$ wherein $p_i$ equals the path length of frequency i, and c equals the speed of light. Similarly, $\omega_3$ must be delayed by a period equal to $(p_3-p_6)/c$.

Figure 5:
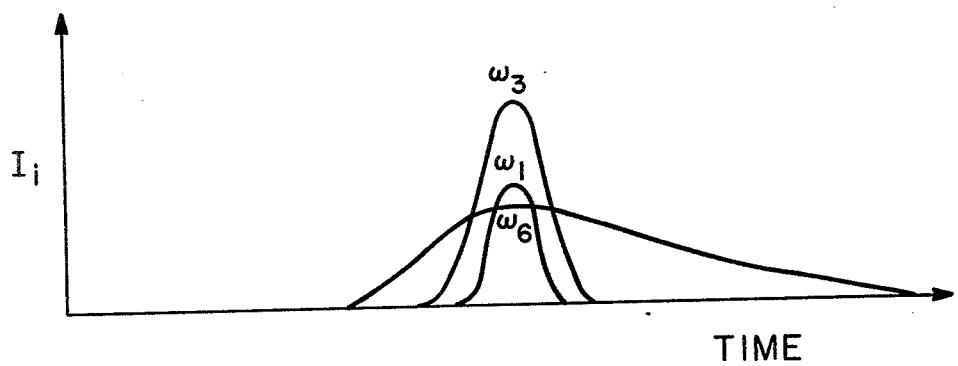
FIG. 5 is a graph of intensity versus time of a time delayed, spectrum conditioned multiple frequency laser beam provided by the present invention.

FIG. 5 illustrates an output beam wherein $\omega_1$ and $\omega_3$ have been delayed sufficiently to cause simultaneous peaking of $\omega_1$, $\omega_3$, and $\omega_6$. This provides an output beam in which the intensity of each of the selected frequencies peak simultaneously in the output beam.

Of course, any selected freequency can be delayed by a desired amount with the embodiments shown in FIGS. 1 and 2 for the purpose of compressing a pulse made of a sequence of pulses of different frequencies, or to adjust the sequence of peaking in a single output beam to provide more advantageous stimulation of an optical amplifier. This can be useful to either increase intensity in a laser process such as laser fusion, or for obtaining maximum power from an amplifier where competing modes may prevent maximum utilization of amplifier capability for other pulse frequency sequences.

Therefore, the present invention provides a device for specifying time delays of preselected frequencies in a multifrequency beam by altering the propagation distance of spatially separated single frequency beams. The resultant output beam can therefore contain preselected frequencies delayed by any desired period to provide simultaneous peaking or peaking at any desired time according to the desired use of the output beam.

Obviously many modifications and variations of the present invention are possible in light of the above teachings. It is therefore to be understood that within the scope of the appended claims, the invention may be practiced otherwise than as specifically described and that the subject matter disclosed herein and not claimed shall not be precluded from being later claimed in the present application, or a continuation, a continuation-in-part, or reissue application.

What is claimed is:

1. A device for producing a substantially parallel beam of laser radiation of preselected frequencies having specified time delays from a multiple frequency laser beam comprising:

a first grating disposed at a first predetermined location on a focal plane, said first grating aligned to diffract said multiple frequency laser beam into a plurality of spatially separated single frequency beams;

first focusing reflector means aligned to focus said single frequency beams on said focal plane;

means for altering propagation distance of preselected single frequency beams to provide said specified time delays of said preselected frequencies;

an apertured mask disposed at said focal plane, said apertured mask having apertures at preselected points to transmit said preselected single frequency beams;

second focusing reflector means aligned to direct said preselected single frequency beams to a second predetermined location on said focal plane;

a second grating disposed at said second predetermined location on said focal plane, said second grating aligned to diffract said preselected set of single frequency beams to a substantially parallel beam of preselected frequencies having specified time delays;

whereby disposition of said first and second gratings on said focal plane allows said single frequency beams to be focused on said predetermined area of said focal plane with central rays of said single frequency beams parallel so as to enhance reconstitution of said substantially parallel output beam.

2. The device of claim 1 wherein said first and second mirrors comprise center sections of spherically shaped mirrors.

3. The device of claim 1 wherein said means for altering propagation distance comprises optical means for directing said spatially separated single frequency beams over modified path lengths.

4. The device of claim 1 wherein said optical means comprises:

a plurality of flat reflectors for redirecting said single frequency beams;

a collimating lens aligned to form parallel single frequency beams;

a focusing lens aligned to refocus said parallel single frequency beams.

5. A device for producing a substantially parallel beam of laser radiation of preselected frequencies having specified time delays from a multiple frequency laser beam comprising:

a first grating disposed at a first predetermined location on a focal plane, said first grating aligned to diffract said multiple frequency laser beam into a plurality of spatially separated single frequency beams;

first focusing reflector means aligned to focus said single frequency beams on said focal plane;

an apertured mask disposed at said focal plane, said apertured mask having apertures at preselected points to transmit said preselected single frequency beams;

second focusing reflector means separated from said first focusing reflector means by a predetermined distance to provide said specified time delays of said preselected set of single frequency beams, said second focusing reflector means aligned to direct said preselected single frequency beams to a second predetermined location on said focal plane;

a second grating disposed at said second predetermined location on said focal plane, said second grating aligned to diffract said preselected set of single frequency beams to a substantially parallel beam;

whereby disposition of said first and second grating on said focal plane allows said single frequency beams to be focused on said predetermined area of said focal plane with central rays of said single frequency beams parallel so as to enhance reconstitution of said substantially parallel output beam.

* * * * *